United States Patent [19]
Ewers

[11] 3,837,610
[45] Sept. 24, 1974

[54] PLAYGROUND SUPPORT USING COMPRESSIBLE ELASTOMER ELEMENT

[75] Inventor: Ronald L. Ewers, Hillsdale, Mich.

[73] Assignee: Game Time, Inc., Litchfield, Mich.

[22] Filed: Oct. 2, 1972

[21] Appl. No.: 293,784

Related U.S. Application Data
[63] Continuation-in-part of Ser. No. 125,629, March 18, 1971, abandoned.

[52] U.S. Cl.................... 248/374, 403/225, 272/52
[51] Int. Cl............................................... F16j 1/38
[58] Field of Search........... 248/374, 398; 287/85 R; 272/52, 54, 55

[56] References Cited
UNITED STATES PATENTS

| | | | |
|---|---|---|---|
| 2,712,742 | 7/1955 | Neidhart | 287/85 R |
| 2,949,153 | 8/1960 | Hickman | 248/374 X |
| 3,168,310 | 2/1965 | Strausser | 272/54 |
| 3,204,953 | 9/1965 | Ahrens | 272/52 |
| R24,911 | 12/1960 | Leja | 287/85 R X |

FOREIGN PATENTS OR APPLICATIONS

| | | | |
|---|---|---|---|
| 710,244 | 6/1954 | Great Britain | 287/85 R |

OTHER PUBLICATIONS

Product Engineering, March 1952, pages 119–123, Elastic Rubber Cushion Springs.

*Primary Examiner*—William H. Schultz
*Attorney, Agent, or Firm*—Beaman & Beaman

[57] ABSTRACT

A resilient support for playground apparatus upon which an occupant is seated including a seat supporting member and a fixed support wherein an elastomer, such as rubber, is interposed between the seat support and fixed support such that an oscillating pivotal movement about an axis compresses the elastomer, and produces a resilient support, and oscillation, of the seat. The playground equipment includes a polygonal support, and the seat includes a polygonal member extending through the support. The compressible elastomer elements are so disposed between the polygonal members as to be compressed during relative angular rotation occurring between the polygonal members.

1 Claim, 4 Drawing Figures

PATENTED SEP 24 1974 3,837,610

PLAYGROUND SUPPORT USING COMPRESSIBLE ELASTOMER ELEMENT

CROSS-REFERENCE TO RELATED APPLICATIONS

This application is a continuation-in-part application of my copending U.S. Application Ser. No. 125,629, filed Mar. 18, 1971, entitled Resilient Playground Equipment Support, now abandoned.

BACKGROUND OF THE INVENTION

The invention pertains to playground equipment for supporting an occupant wherein the occupant may produce movement of the seat by shifting his weight, and wherein the occupant is resiliently supported upon an elastomer material.

Playground equipment wherein motion of occupant supported apparatus is produced by a shifting of the occupant weight, or other occupant initiated movement has long been popular. Teeter totters and seesaws, roundabouts, and swings are typical devices of this type. Similar apparatus to the conventional devices mentioned above have also enjoyed popularity wherein the occupant supporting seat is mounted upon a metal spring, such as a coil compression spring, or metal leaf spring, whereby a resilient, resilient random movement is produced as the occupant shifts his weight relative to the support. The assignee's U.S. Pat. No. 3,292,924 illustrates an example of a compression spring supported playground apparatus for accommodating several occupants. Metallic spring supported playground seats are also mounted upon single compression springs, and have enjoyed wide popularity, the seat often being in the form of an animal or other figure.

While metallic spring supported playground devices produce a pleasing random and resilient motion the stresses imposed upon the springs are considerable and spring failures have occurred. Additionally, the flexing metal spring, such as of the compression coil type, produces noise, and as it is possible for a child to pinch a finger between the spring coils a safety hazard is presented in those devices wherein the coil spring, or springs, cannot be readily enclosed.

Attempts have been made to produce playground apparatus wherein an elastomer material is substituted for a metallic spring, and reference is made to the embodiments shown in U.S. Pat. No. 3,204,953. In particular, while the embodiment illustrated in FIGS. 1 and 2 of the aforementioned patent produces a resilient oscillation about a relatively fixed axis, this type of device has not been commercially feasible in that the elastomer joint requires bonding to rigid members, and high twisting and torsional stresses are imposed upoon the elastomer. The life of devices relying upon bonding, and imposing shearing and twisting forces upon the elastomer, is not sufficient to produce an acceptable product subjected to the hard usage and abuse encountered by the apparatus.

SUMMARY OF THE INVENTION

It is an object of the invention to provide playground apparatus which is solely supported by an elastomer material wherein the playground apparatus is capable of a resilient oscillatory movement about a relatively fixed axis. The movement of the playground apparatus results from the alternate compressing and releasing of an elastomer material, and as the elastomer material is not subjected to significant twisting and torsion forces the effective life thereof is substantially greater than with playground apparatus utilizing metallic spring devices.

In the practice of the invention the sole support of the seat, and the occupant, is through an elastomer material mounted upon a fixed support, and the primary movement of the occupant occurs in a vertical plane perpendicularly disposed to the axis of oscillation. The use of the elastomer support for the seat supporting member produces a very quiet apparatus having pleasing characteristics of motion. The safety features of such a device are excellent as coil springs and other relatively moving parts which may pinch or otherwise harm are eliminated, and the durability and effective life of the elastomer is greater than the durability of metal spring playground devices of a comparable type. Additionally, while the playground apparatus uses an elastomer material to produce the desired oscillation, the elastomer material is compressed during stressing, rather than twisted or subjected to shearing forces, and thus the likelihood of elastomer material failure is substantially reduced over devices wherein the elastomer is subjected to tearing, shearing and bond destroying forces.

In the practice of the invention, the fixed support member is attached to a base, and includes a horizontally disposed shaft extending through a hollow hub. In the preferred embodiment the seat supporting member is fixed to the hub by means of a column, and the seat is attached to the upper column end. The hub and the shaft are of a polygonal configuration, being square in transverse cross section, and a plurality of elongated elastomer elements are interposed between the hub and the shaft, and are of such a transverse dimension as to be compressed upon relative rotation between the hub and shaft occurring. Also, a limited rolling motion is imposed upon the elastomer elements during relative rotation of the hub and shaft. In view of the square transverse cross section of the hub and shaft, the elastomer elements are compressed regardless of the direction of relative rotation between the hub and shaft, and thus the seat is capable of a back and forth oscillation producing compression of the elastomer in either direction of seat oscillation. No torsion or twisting of the elastomer elements takes place, and the elastomer elements are not bonded to any surfaces of the hub or shaft.

It is therefore an object of the invention to provide a movable playground apparatus supported upon an elastomer material wherein the occupant and seat may oscillate about an axis under the influence of the shifting of the occupant's weight, and the occupant's movement is produced by a compression of the elastomer material.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
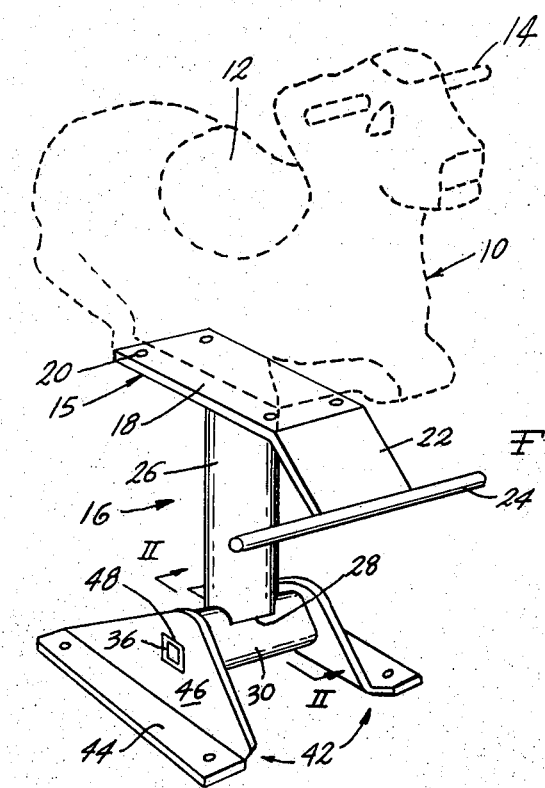
FIG. 1 is a perspective view of playground apparatus constructed in accord with the invention, the occupant's seat being illustrated in dotted lines.

Playground apparatus using the inventive concepts may take several forms, various embodiments being within the scope of one skilled in the art. However, the drawings are directed to a very practical and simplified manner in which the inventive concept may be practiced. In the disclosed embodiment the apparatus is particularly constructed for supporting a single occupant seated upon a playground seat 10 indicated in dotted lines in FIG. 1. The apparatus of the invention may be used with a wide variety of different shapes of seats, and the seats may be in the form of an animal, such as the seats shown in assignee's U.S. Pat. Nos. Designs 213,274; 213,276 and 213,277. Such seats include a saddle 12 which the occupant straddles, and handgrips 14 are included in the animal configuration for grasping by the seated occupant.

The seat 10 is bolted to a seat attachment member 16 which includes a platform 15 having a horizontal portion 18 having bolt holes 20 defined therein wherein bolts, not shown, may be inserted through the bottom of the portion 18 into the seat 10. The platform 15 also includes a forwardly and downwardly extending portion 22 terminating in a footrest bar 24 having free ends laterally extending from the portion 22 for supporting the occupant's feet.

The seat attachment member 16 also includes a tubular column 26 formed of a steel tube which may be approximately 10 inches long. The upper end of the column 26 is perpendicular with respect to the column axis and is welded to the underside of the platform portion 18.

Figure 3:
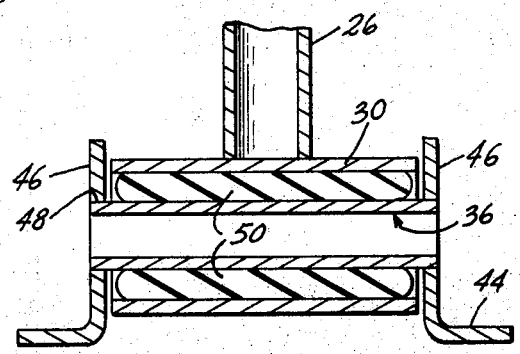
FIG. 3 is an elevational, sectional view taken through the diameter of the hub and shaft along Section III—III of FIG. 2.

The lower end of the column 26 is shaped at 28 to conform to the outer configuration of an elongated hollow tubular hub 30 having an axis perpendicularly disposed to the longitudinal axis of the column. As will be apparent in FIGS. 1 and 3, the column 26 is centrally located upon the length of the hub 30, and the shape 28 of the column lower end engages a substantial portion of the hub and permits the hub to be rigidly welded to the column.

The hub 30 is of a square transverse cross section having rounded corners 32 interconnecting planar sidewall portions 34. Internally, the inner radiused surfaces of the corners 32 are tangentially disposed to the inner planar surfaces of adjacent sidewall portions 34 disposed at right angles to each other.

Concentrically extending through the hub 30 is a shaft member 36 which is also of a square transverse cross section having exterior sidewalls 38, adjacent sidewalls being perpendicularly disposed to each other, and intersecting at relatively sharp corners 40.

The shaft 36 is supported at its ends by supports or base members 42 adapted to be bolted or otherwise fixed to a concrete base, floor or similar supporting surface. The base members 42 are of an identical configuration and each includes a horizontally disposed portion 44 in which mounting holes are formed. A vertical portion 46 extends upwardly from the associated horizontal portion 44 and is of a central maximum height at least equal to the maximum vertical height of the uppermost portion of the hub 30. The vertical portions 46 each include a square hole 48 which closely receives the shaft 36, and the shaft is welded to each member 42 for rigidly interconnecting the base members, and the shaft maintains the base members in spaced parallel relationship. The size and configuration of the vertical portions 46 is such as to totally "enclose" the ends of the hubs 30 with respect to the axial projection of the hub, and the spacing between the ends of the hub and inner surface of the portions 46 is relatively small to render accessibility to the inside of the hub, and the elastomer elements, difficult, and thus the portions 46 provide protection of the elastomers and discourage vandalizing the elastomer.

The elastomer material used with the apparatus is in the form of four elongated rolls or elements 50 formed of rubber, or similar elastic resilient material. The elements 50 may be of a normal circular cross section, or may be preformed to a generally triangular cross section similar to that illustrated in FIG. 2, wherein the apparatus is shown in its normal or at rest position. The transverse dimension of the elastomer elements 50 is such that when the elements are inserted between the hub 30 and the shaft 36 they are maintained in a state of compression thereby precompressing the element, and improving the resiliency characteristics of the apparatus. Also, precompression of the elastomer prevents axial displacement of the hub 30 and column 26 upon the shaft 36, and prevents any "looseness" from existing between the hub and the shaft.

Initially, the components of the playground apparatus in accord with the invention are assembled such that upon the base members 42 being mounted upon a horizontal surface, the column 26 will be vertically disposed. A child, seated upon the seat 10, produces oscillatory motion of the seat and platform 15 and column 26 by shifting its weight "back and forth" in a direction perpendicular to the horizontal axis of the hub 30 and shaft 36. A "back and forth" motion produced by the occupant causes the seat 10 to oscillate in a plane perpendicularly disposed to the axis of the hub and shaft, and the degree of oscillation is dependent upon the energy and force expended by the occupant in shifting his weight. Of course, the movement produced results solely from compression occurring within the elastomer elements 50 due to the relative rotation of the hub 30 and the shaft 36. The motion produced by the shifting of one's weight to oscillate the seat and movable components is pleasing in that the elastomer prevents abrupt and sudden unexpected movement, and while the motion is primarily in the plane described above, lateral motion of a limited nature may be achieved if force is applied in a lateral direction with respect to the primary plane of movement, and the oscillatory movement produced is without the generation of significant noise.

Figure 2:
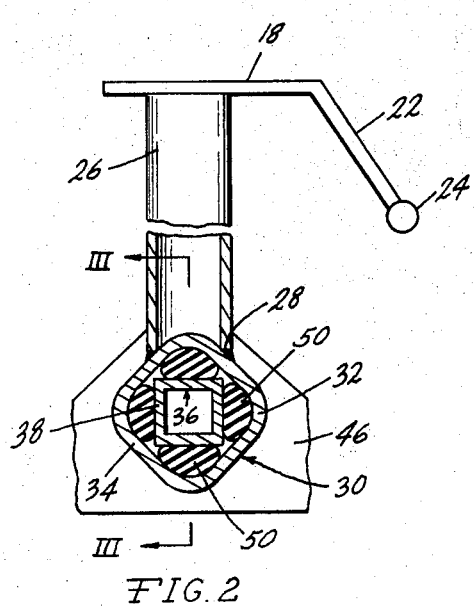
FIG. 2 is an enlarged, elevational, detail, sectional view taken through the hub, shaft and elastomer along Section II—II of FIG. 1.
Figure 4:
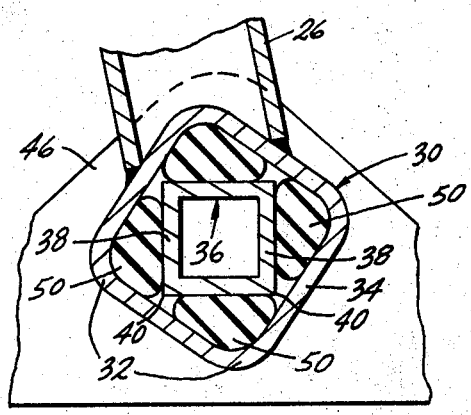
FIG. 4 is an enlarged, detail, elevational, sectional view taken through the hub and shaft illustrating the relationship of the hub and shaft during compression of the elastomer elements.

As apparent in FIG. 2, each elastomer element 50 is located within an inner corner 32 of the hub and engages two sidewall portions 34, and also engages a single shaft sidewall 38 intermediate corners 40. As relative rotation between the hub and shaft occurs, the elements 50 tend to "roll" along the portions 34 and 38 about the longitudinal axis of each roll, and such rolling motion minimizes wearing of the elements and limits the forces imposed upon the elements 50 to compression forces. Of course, the transverse dimension of the hub 30 and the shaft 36 is such that the extent of "rolling" of the elements that occurs will not cause an element to roll from a shaft sidewall 38 with which it is originally associated. Rather, prior to such an extent of element motion occurring the compressive forces imposed upon the elements are great enough to resist the forces imposed upon the column by the seat occupant and reverse the direction of seat oscillation.

The operation and the relationship of the hub 30, shaft 36 and roll elements 50 may be further appreciated from the disclosure of the joints disclosed in U.S. Pat. Nos. 2,712,742 and 2,729,442.

In the disclosed embodiment, the shaft 36 is illustrated as affixed to the fixed base members 42, and the hub 30 is attached to the movable seat components. This relationship could be reversed within the scope of the invention in a manner understood by those skilled in the art. Likewise, the column 26 could be rigidly attached to the base members 42, and the hub, and shaft directly interposed between the upper end of the column and the seat attachment platform 15, which would produce an oscillation having a lesser degree of radial movement than that illustrated. Such modifications as those mentioned above are considered to be within the scope of one skilled in the art and within the spirit of the present invention.

I claim:

1. A resilient playground equipment support for providing an oscillating movement about a substantially horizontal axis characterized by its quietness, safety, pleasing character of movement and durability comprising, in combination, a fixed support member comprising a pair of spaced elements each including a horizontally disposed portion and a vertically disposed portion, an occupant seat attachment member including a column having an upper end and a lower end, seat attachment means defined at said column upper end, an annular hub defined at said column lower end having an axis, open ends, and a polygonal inner surface defined by a plurality of first surfaces, adjacent first surfaces being angularly disposed to each other, said hub being disposed between said elements' vertically disposed portions and said vertically disposed portions being located adjacent said hub ends and shielding said ends from exterior access, a shaft affixed to and extending between said vertically disposed portions of said support member spaced elements co-axially extending through said hub, said shaft having an outer polygonal surface defined by a plurality of second surfaces, adjacent second surfaces being angularly disposed to each other, a plurality of elastomer elements interposed between said first and second surfaces compressed between said first and second surfaces permitting relative oscillation between said hub and shaft about an axis substantially coincident with said hub axis whereby said seat attachment member is resiliently mounted upon said support member by said elastomer elements, said elastomer elements being shielded by said elements' vertically disposed portions.

* * * * *